(12) United States Patent
Kaderli

(10) Patent No.: US 9,486,000 B2
(45) Date of Patent: Nov. 8, 2016

(54) GRILLTOP SMOKER BOX

(71) Applicant: Mark Kaderli, Austin, TX (US)

(72) Inventor: Mark Kaderli, Austin, TX (US)

( * ) Notice: Subject to any disclaimer, the term of this patent is extended or adjusted under 35 U.S.C. 154(b) by 350 days.

(21) Appl. No.: 14/211,724

(22) Filed: Mar. 14, 2014

(65) Prior Publication Data

US 2014/0261016 A1   Sep. 18, 2014

Related U.S. Application Data

(60) Provisional application No. 61/786,753, filed on Mar. 15, 2013.

(51) Int. Cl.
*A47J 37/07* (2006.01)
*A23B 4/052* (2006.01)
*A23B 4/044* (2006.01)

(52) U.S. Cl.
CPC .............. *A23B 4/0523* (2013.01); *A23B 4/044* (2013.01); *A23B 4/052* (2013.01); *A47J 37/0704* (2013.01); *A47J 37/0786* (2013.01)

(58) Field of Classification Search
CPC .. A23B 4/052; A23B 4/0523; A23B 5/0526; A23B 4/044; A47J 37/0786; A01G 13/06; F41H 9/06
USPC .......... 99/482, 481, 415, 449, 450; 126/59.5
See application file for complete search history.

(56) References Cited

U.S. PATENT DOCUMENTS

| | | | | |
|---|---|---|---|---|
| 1,017,647 | A * | 2/1912 | Burton | A23B 4/052 99/482 |
| 3,788,301 | A * | 1/1974 | Terry | A23B 4/0523 126/59.5 |
| 4,724,756 | A * | 2/1988 | Sarparanta | A23B 4/052 126/9 R |
| 4,869,163 | A | 9/1989 | Haskins | |
| 4,962,696 | A | 10/1990 | Gillis | |
| 5,653,162 | A | 8/1997 | Lunde | |
| 5,768,983 | A * | 6/1998 | Treiber | A23B 4/052 126/275 R |
| 6,019,035 | A | 2/2000 | Jonas | |
| 6,102,028 | A | 8/2000 | Schlosser | |
| 6,360,654 | B1 * | 3/2002 | Cornfield | A47J 36/16 220/912 |
| 2002/0166460 | A1 | 11/2002 | O'Shea | |
| 2008/0163765 | A1 | 7/2008 | O'Shea | |
| 2008/0257174 | A1 | 10/2008 | Turner | |

* cited by examiner

*Primary Examiner* — Reginald L Alexander
(74) *Attorney, Agent, or Firm* — Murphy Strategic IP; George L. Murphy

(57) ABSTRACT

Disclosed herein is a grilltop smoker box designed to sit atop a cooking grid of a barbecue grill. The grilltop smoker box has a base with an aperture and a cover that covers the base. The cover and base define a space or cavity for the accumulation of smoke. The cover also comprises a port that is positioned above the base for the exit of smoke, and an outlet for directing smoke to food on a cooking grid of a barbecue grill. Embodiments of the invention may comprise other optional features.

19 Claims, 4 Drawing Sheets

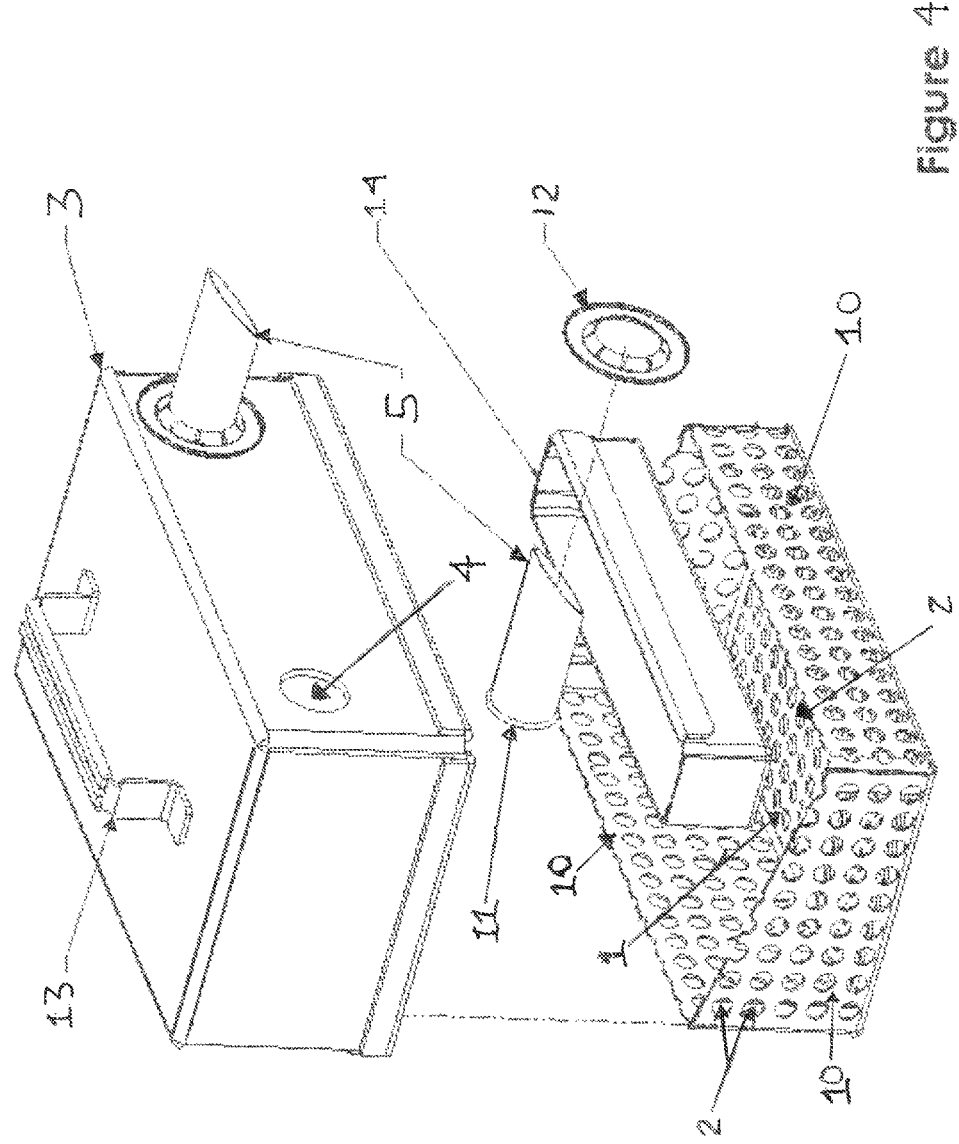

GRILLTOP SMOKER BOX

This application claims the benefit of priority under 35 U.S.C. §119 to U.S. Provisional Application No. 61/786,753, filed on Mar. 15, 2013, which is incorporated herein by reference in its entirety.

The present disclosure relates generally to a smoker assembly for use with barbecue grills for imparting smoke flavors into a grilled food product.

Often when barbecuing or grilling foods it is desirable to impart various types of smoke flavors to the grilled food. Grilling food with charcoal and wood fuel sources can produce a smoke flavor in foods more easily than grilling with a gas-fired or electric grill.

A major drawback of gas and electric grilling is the lack of a convenient and efficient way to impart smoke flavor and other flavors to the grilled food. The most common device currently in use and available commercially is a steel or cast iron "smoking tray". The typical smoking tray is a shallow container that has a solid bottom and in some instances a lid with holes. Wood chips are added to the container which is placed somewhere within the grill, typically beneath the cooking grid. As the box is heated, the wood chips char and produce smoke that exits the tray and interacts with food on the cooking grid. Some shortcomings of these devices are that the wood chips or other smoke source materials are slow to begin smoking and deliver minimal smoke. Also, the smoke that emanates from the materials exits the device and enters the cooking chamber above the grilling surface or cooking grid and often exits through the grill lid without coming into prolonged contact with the grilled food.

Others have designed alternative devices or modified smoker trays in attempts to overcome the difficulties of smoking food on gas grills and the shortcomings of the smoking tray. U.S. Pat. App. No. 2008/0257174 describes a modified smoker tray designed to rest atop the grilling surface or cooking grid and facilitate airflow around the smoke source. However, this device still suffers from many of the shortcomings of previous smoker trays. U.S. Pat. No. 6,102,028 describes a modified smoker tray with openings that allow for heat source elements to pass through the smoker tray allowing for more direct contact with the smoke fuel. U.S. Pat. App. No. 2002/0166460 describes a smoker tray with a modified bottom designed to rest directly on a heat distribution bar of a gas grill. This design allows for increased combustion of the smoke fuel, but inconveniently eliminates easy access since it resides under the cooking grid and increases the potential for injury if the operator attempts to replenish the tray with smoke fuel while grilling. U.S. Pat. No. 4,962,696 describes a smoking chamber that completely covers and rests atop a grill cooking surface. Such a device is large, heavy, and cumbersome to use.

Disclosed herein is a "grilltop" smoker box, designed to be placed on the cooking grid of a grill, with optional features that eliminate the drawbacks of the smoker trays and chambers currently in use.

In various embodiments, a "grilltop" smoker box is disclosed which comprises (a) a base having at least one aperture or void that allows for air circulation through the base, (b) a cover positioned over the base, wherein the cover surrounds a region of space above the base that defines a cavity for smoke accumulation, the cover having at least one port for the exit of smoke, and (c) an outlet that is attached to the cover for directing smoke from the port onto food. The smoker box of the invention enables smoke-producing material present on the base, for example wood chips or charcoal, to be rapidly heated and ignited when the smoker box is placed on the surface of a grill. Enclosing a space or cavity above the base having burning wood chips results in partial or complete snuffing of the flames emanating from the wood chips, thereby creating slower-burning embers for smoke generation. Thus, smoke-generating material can produce smoke for longer periods of time than they are capable of when used in other types of smokers or smoke boxes. Outlets direct smoke, emanating from the smoke box through ports in the cover, onto food on the grill.

In various embodiments, the base may comprise a solid material such as a metal having one aperture or a plurality apertures or voids in the metal. In other embodiments, the base may comprise a material having an open weave structure with voids or apertures or channels among the solid material used for the weave.

In certain embodiments of the invention, the cover encloses and covers the base and defines a space or cavity above the base in which smoke accumulates as the fuel combusts. In certain aspects of the invention, the base is attached to the bottom of the cover. In other aspects of the invention, the base and cover are not attached to one another. In various embodiments, the cover has one port or a plurality of ports for the exit of smoke from the smoke accumulation cavity. In embodiments of the invention, the grilltop smoker box has one outlet or a plurality of outlets, such as for example a tube, that directs smoke exiting a port in the cover, onto a portion of food on a cooking grid.

In some embodiments of the invention, an optional vessel is provided for placing on the base within the smoke accumulation cavity. The vessel can be used for holding liquids, such as for example water, wine, vinegar, or other liquids useful for cooking.

In various embodiments, the cover of the grilltop smoker box has a handle. The handle can facilitate positioning the smoker box on the cooking grid and allows for the easy addition or replenishment of wood chips to the smoker box during the cooking process. Also in some embodiments, the cover comprises a door which can facilitate the addition of material to the smoke accumulation cavity. A door can be a hinged, sliding, or revolving barrier which when opened allows access to the smoke accumulation cavity.

Other objects, features, and advantages of the present invention will become apparent in the following detailed description of certain exemplary embodiments.

BRIEF DESCRIPTION OF THE DRAWINGS

FIG. 1 is an exploded view of a grilltop smoker box showing parts of the invention and fuel.

FIG. 4 depicts one embodiment of the present invention. FIG. 4 is a perspective view of a grilltop smoker box in which base 1 has optional sides 10 and forms a basket. Cover 3 has an attached handle in this embodiment.

DESCRIPTION OF CERTAIN EXEMPLARY EMBODIMENTS

Reference will now be made in detail to certain exemplary embodiments according to the present disclosure, certain examples of which are illustrated in the accompanying drawings.

To assist in understanding the present invention, certain terms are first defined. Additional definitions are provided throughout the application.

In this application, the use of the word "a", "an", or "the" when used in conjunction with the term "comprising" in the claims and/or in the specification may mean "one", but it is also consistent with meaning "one or more", "at least one", and "one or more than one". Also in this application, the use of "or" means "and/or" unless stated otherwise. Furthermore, the use of the term "including," as well as other forms, such as "includes" and "included," are not limiting.

In this application, "grilltop" smoker box refers to a smoker box that is designed to be placed on or atop a cooking grid or cooking surface of a barbecue grill. The terms grill-top, grilltop, cooking grid, and cooking surface are used interchangeably.

Figure 1:
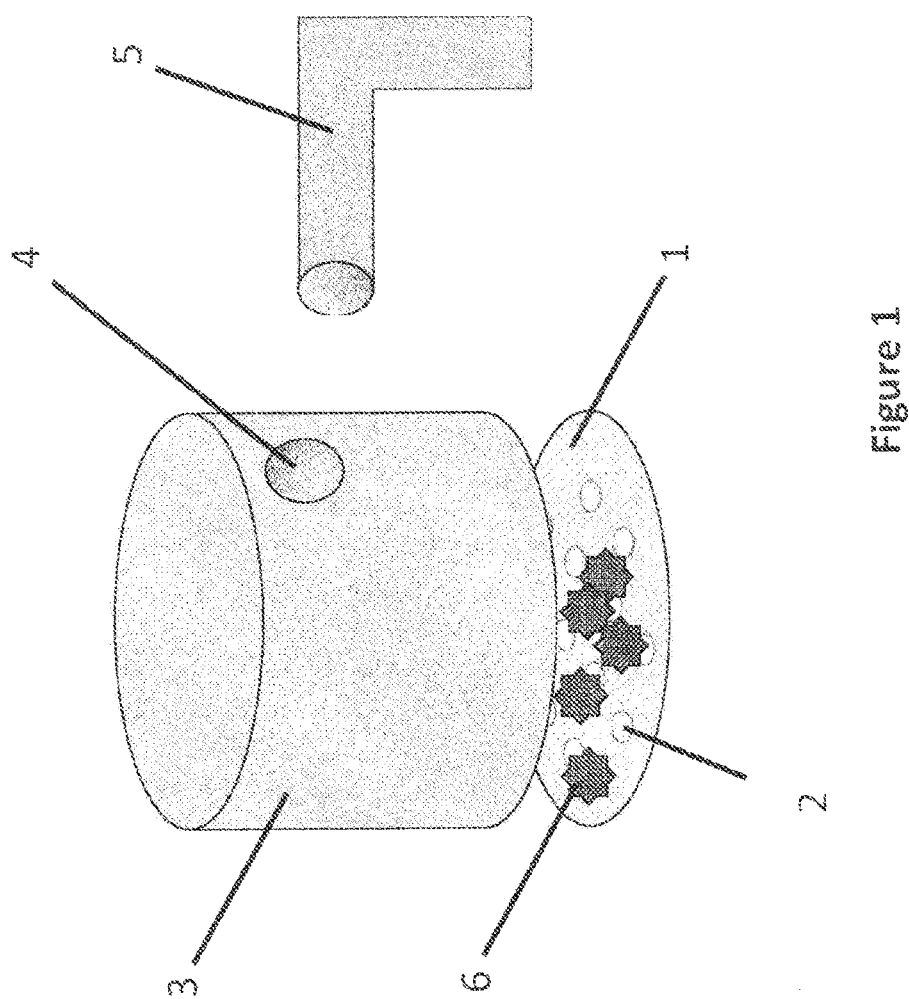
FIG. 1 depicts one embodiment of the present invention.

FIG. 1 shows an exploded view of one exemplary embodiment of a grilltop smoker box with components. In this embodiment, the smoker box comprises (a) base 1 having a plurality of voids or apertures 2; (b) cover 3, comprising a port for the exit of smoke and having sides and a top, such that when cover 3 is positioned over base 1 a cavity or space is defined that is surrounded by cover 3 and above base 1; and (c) outlet 5 operably positioned at port 4 for directing smoke onto food atop a cooking grill. Fuel 6 for producing smoke is shown positioned on base 1.

Figure 2:
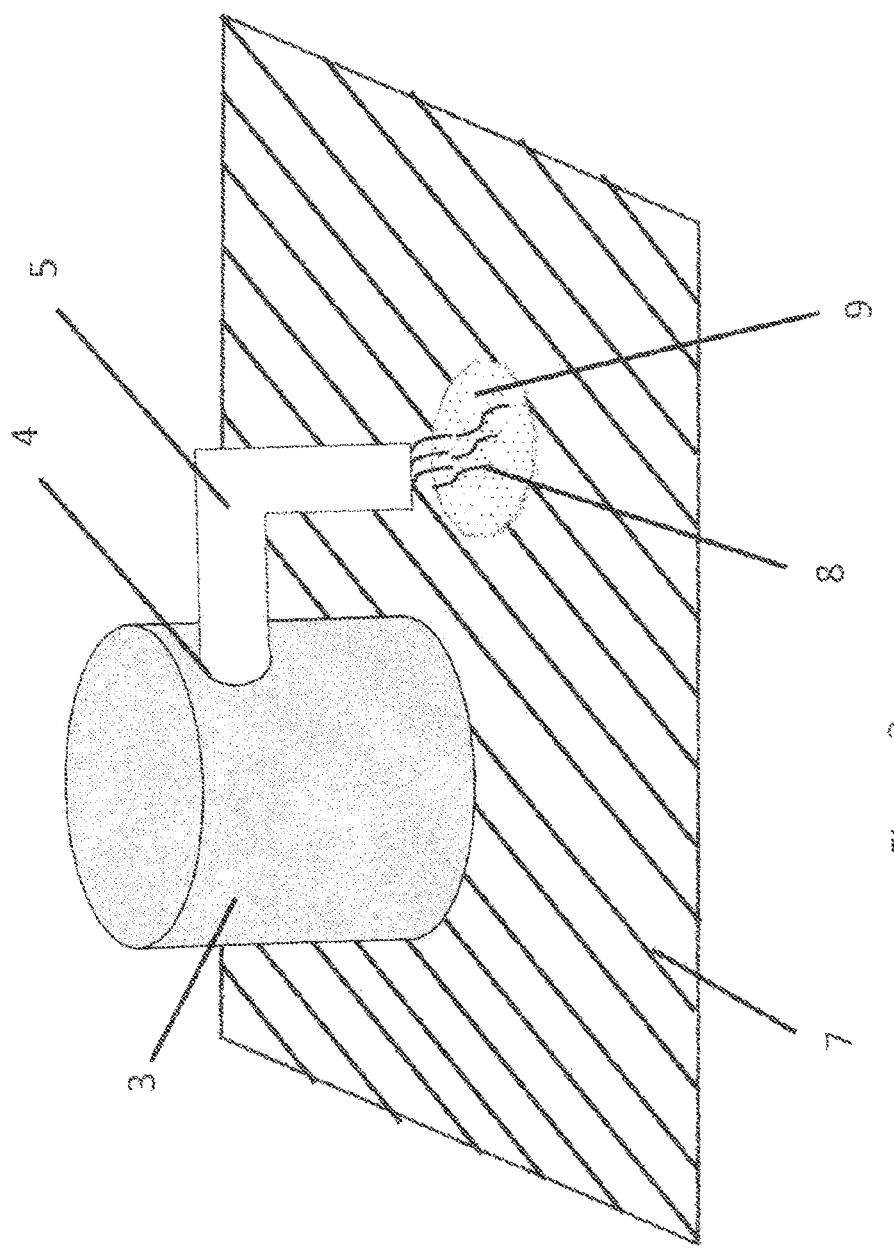
FIG. 2 shows one embodiment of an assembled grilltop smoker box and an embodiment for using the invention to impart smoke to food on a cooking grid. Base 1 is not visible in this depiction, because it is covered by cover 3

FIG. 2 depicts one embodiment of a smoker box of the invention and it's positioning on a cooking grate during use. In this embodiment, cover 3 covers base 1 having a fuel source 6 and resting on cooking grate 7, thereby enclosing a cavity in which smoke accumulates. Operably positioned with port 4 on the side of cover 3 is outlet 5 that directs smoke 8 from port 4 onto a portion of food 9.

In the exemplary embodiments shown in FIG. 1 and FIG. 2, base 1 is circular in shape and cover 3 is cylindrical and has a circular top portion that is not separable from the sides. In other embodiments of the invention, such as that shown in FIG. 4, base 1 is rectangular. Base 1 may be a square, a rectangle, a circle, or any geometric shape. Likewise, in certain embodiments of the invention the cross sectional shape and area of cover 3 may be substantially similar or identical to the shape and/or area of base 1. However in other embodiments of the invention, cover 3 need not have a cross sectional shape that is identical with the shape of base 1. That is cover 3 may have a square or a rectangular cross section and still be operably positionable over, for example, a circular base 3 and operably form a smoke accumulation cavity defined as being enclosed by base 1 and cover 3. Similarly, and by example, cover 3 may be circular in cross section as in FIG. 1 and be operably positionable over a square or rectangular or other shape base.

The nature of the invention is such that cover 3 does not comprise a bottom, a bottom being defined as a closed end that is distal from the closed top of cover 3. However, in specific embodiments of the invention, base 1 and cover 3 may be operably attached to one another. For example, base 1 may be soldered or welded to the lower edges of the sides of cover 3 or be hingedly attached or removably attached to cover 3.

Figure 3:
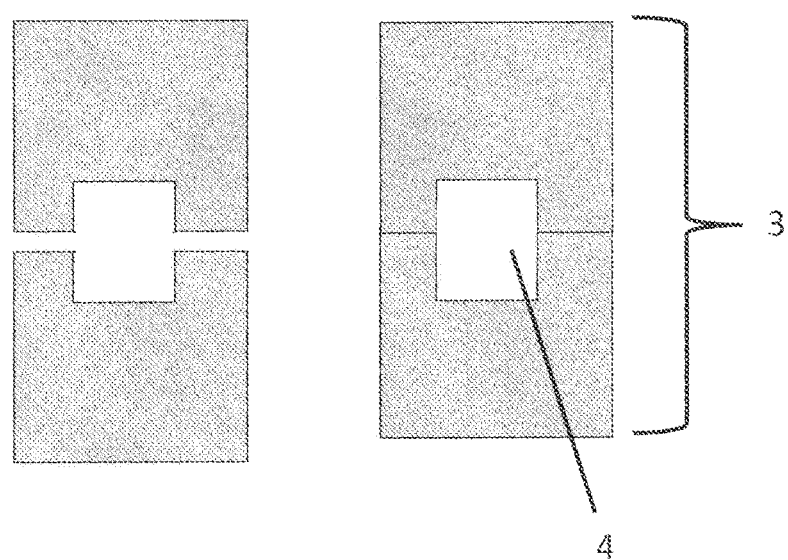
FIG. 3 shows an embodiment in which a plurality of sections are assembled to make cover 3, forming a port 4 when the sections are assembled.

In some embodiments of the invention, cover 3 may comprise a plurality of sections or pieces. For example, in some aspects of the invention, cover 3 may comprise a plurality of sections that fit together. In some specific embodiments of the invention in which cover 3 comprises a plurality of sections, port 4 may be formed when two sections of the cover are assembled. This may be advantageous when working with certain materials that are more efficiently or easily manufactured such that a first section of a port 4 is present on a first section of cover 3 and a second section of port 4 is present on a second and adjacent section of cover 3. This embodiment is shown in FIG. 3, which represents a side view of two rectangular sections of cover 3. First and second rectangular sections of cover 3 may be manufactured with a cutout on their edges, such that when the two sections are assembled (atop one another in this exemplary embodiment), a port 4 is formed that will accept an outlet 5 having a rectangular cross section such that smoke exiting port 4 may be directed to food present on a cooking grid. Port 4 may be any shape, and is typically circular, but may be rectangular as shown in FIG. 3, or square or any geometric shape compatible with the operable positioning of outlet 5.

FIG. 4 shows one embodiment of a grilltop smoker box of the invention having numerous optional features. In some embodiments, optional sides 10 that project upward may be attached to base 1, thereby forming a basket with base 1 as the bottom of the basket. In this exemplary embodiment, base 1 has a plurality of apertures including a plurality of apertures on optional sides 10. However, in certain specific embodiments, optional sides 10 do not comprise apertures. A base 1 having optional sides 10 and thus forming a basket may allow for easier addition of fuel to the smoking cavity and prevent spilling of fuel when cover 3 is lifted or when the smoker box is moved. In this embodiment, cover 3 fits over base 1 having optional sides 10 and has a plurality of ports 4 and outlets 5. In this example, outlet 5 has flanged end 11. Outlet 5 in this specific embodiment is configured to extend through port 4 with flanged end 11 being inside of cover 3, and is held in place with push-on fastener 12. In this embodiment, cover 3 also comprises an optional handle 13, shown here attached to the top of cover 3. In other embodiments of the invention it may be desirable or advantageous for handle 13 to be attached to a side of cover 3. Also shown here is optional vessel 14 that may rest atop base 1 or inside a basket formed by base 1 and optional sides 10.

It is a useful aspect of the invention that the one or more apertures of base 1, be of adequate size to allow efficient combustion of and smoke production from the fuel source. In some aspects of the invention, the apertures present on base 1 may comprise an area that represents a minimum of approximately 10% of the area of the base 1. The area of base 1 is defined as the amount of space inside the boundary defined by the sides of base 1, not including any optional sides 10. For example, a square base having sides with lengths of 4 inches, has an area of 16 square inches within its boundaries. An aperture 2 comprising an area that is approximately 10% of that base area would have an area of approximately 1.6 square inches. In other aspects of the invention, the percentage area of base 1 represented by aperture 2 is greater than 20%, 30%, 40%, 50%, 55%, 60%, 65%, 70%, 75%, 80%, 85%, 90%, or 95%, but less than 100% of the area of base 1.

The one or plurality of apertures 2, may have any shape that supports combustion of fuel and smoke production. In embodiments of the invention, apertures may be circular, square, rectangular, or randomly shaped. A single base 1 may comprise a plurality of apertures of various sizes and shapes. The size and shape of apertures 2 need only be compatible with maintaining the fuel source atop the base and providing adequate ventilation for combustion and smoke production.

In embodiments of the invention, it may be useful for the smoker box to be configured for easy addition of fuel atop base 1 within the smoke accumulation cavity defined by base 1 and cover 3. In some embodiments, cover 3 may be lifted from the cooking grid, leaving base 1 resting atop the grid. Fuel and/or other optional items may then be added atop base 1. In embodiments of the invention having a base 1 that is attached to cover 3, it is necessary that cover 3 have a means for accessing the smoke cavity and the top of base 1, such that fuel and other items may be added atop base 1. Exemplary means include a removable top or portion of a top on cover 3 or a door on the top or on a side of cover 3. In embodiments having a base 1 hingeably attached to cover 3, cover 3 may be tilted upward and back to allow access to base 1 for the addition of fuel and other optional items. In this embodiment, accessible openings such as a removable top or closeable door are optional.

In certain embodiments of the invention, the grilltop smoker box and components are made of metal, such as for example stainless steel, steel, cast iron, or other metal suitable for use in high heat conditions of a grilling environment. In some aspects of the invention, metals may be coated, for example with a porcelain enamel coating.

In embodiments of the invention, the shape of the smoker box and components, including optional components, may vary and may be custom-designed according to one's desires or needs. Two exemplary shapes are shown in FIG. 1 and FIG. 4. In other embodiments of the invention, cover 3 of the grilltop smoker box may have numerous sides, for example, five, six, or more sides.

In still other embodiments of the invention, cover 3 may be randomly shaped or be custom-designed to have a "novelty" shape. For example, cover 3 may comprise the shape of a human figure, or an automobile, or an animal, or a letter of the alphabet. Numerous embodiments of cover 3 are envisioned that are capable of defining a cavity for the burning of fuel and production of smoke.

Smoker box dimensions may be custom-designed to accommodate other needs. For example, a larger smoker box may be desired for use with a larger barbecue grill, or for placement over a larger gas burner, or to accommodate more smoke-producing material such as wood chips, or to accommodate a larger number of ports 4 and outlets 5, or for other reasons. Similarly, in other embodiments of the invention, a relatively smaller-dimensioned smoker box may be desirable, for example to accommodate use on smaller grills, or to accommodate the placement of more food on a cooking grid, or for other reasons.

Referring to FIG. 4, optional vessel 14 may be any shape and size compatible with fitting on base 1 and allowing for combustion of fuel and the desired smoke production. Optional sides 10 as shown in FIG. 4 may have variable dimensions. In some embodiments of the invention, optional sides 10 attached to base 1, may be all the same height or may have different heights. In these embodiments, modification of the dimensions of optional sides 10 may enable unobstructed passage of smoke through ports 4. That is, no part of optional side 10 obstructs ports 4. In still other embodiments of the invention, optional sides 10 may be modified to have an aperture that aligns with a port 4 on cover 3. In other embodiments, optional sides 10 may extend only a short distance above base 1.

In embodiments of the invention having a circular base 1 and optional side 10 extending upward, optional side 10 may be a cylindrical shape. A cylindrical optional side 10 may have one or more apertures that align with one or more ports 4 of cover 3 when the cover is placed over the base. In these embodiments, a cylindrical cover 3 may be rotated to align or partially align an aperture in optional side 10 with a port 4 on cover 3. Similarly, in these embodiments, cover 3 may be rotated to block the alignment of an aperture in an optional side 10 with a port 4, thus allowing for a buildup or increase of smoke in the cavity of the smoker box. In this manner, the airflow or smoke flow through outlet 5 can be adjusted. It is not a requirement of any embodiment of the invention that an aperture in an optional side 10 have the same dimensions as a port 4.

In embodiments of the invention, outlet 5 is designed to direct smoke onto food that is cooking on a cooking grid of a barbecue grill. When a grilltop smoker box is placed atop a cooking grid, it is useful that outlet 5 have a configuration or shape that is capable of directing smoke downward toward or at food on the grid, or even upward toward or at food on a grid above the smoker box. In the embodiment shown in FIG. 4, outlets 5 are cylindrical in shape, circular in cross section, and have a distal end that is cut at an angle to assist in directing smoke downward toward food on a grid on which the smoker box is resting. Outlets 5 in the embodiment shown in FIG. 4 emerge from cover 3 at an angle that is 90° to the cover, with angled distal ends that direct smoke toward the food on the grid. In other aspects of the invention, such as those shown in FIG. 1 and FIG. 2, outlet 5 has a bend or turn so as to direct the distal, open end downward. In some embodiments of the invention, outlet 5 is capable of directing smoke upward toward food placed atop a cooking grid that is above the grilltop smoker box. Different shapes of outlet 5 may be used for enhancing the directional movement of smoke toward food on a cooking grid. In certain embodiments, outlet 5 may comprise flexible metal that can be adjusted to enhance the directional movement of smoke toward food. In certain aspects of the invention, outlet 5 may extend to or into one or more separate cooking chamber, such that smoke generated in the grilltop smoker box enters the cooking chamber and interacts with food within that chamber Outlet 5 may vary in shape, in size, and length. In some aspects of the invention outlet 5 may be square, triangular, or rectangular in cross section, or have a cross section of other geometrical shape. The area of port 4 and cross sectional area of corresponding outlet 5 may be designed and manufactured to accommodate the transfer of more or less smoke from the smoker box to food on a cooking grid. Similarly, the length of outlet 5 may be adjusted or manufactured to allow, for example, for positional adjustments of food on a cooking grid.

In the embodiment shown in FIG. 4, outlet 5 has flanged end 11. In this embodiment, outlets 5 are positioned with flanged ends 11 on the inside of cover 3 and are held in place against cover 3 with push-on fasteners 12. In other embodiments outlet 5 may not be separable from cover 3.

In certain embodiments, outlet 5 may be rotatable. Rotatability of outlet 5 may be useful for changing the directional movement of smoke toward food on a cooking grid. The embodiment shown in FIG. 4 enables rotation of outlet 5 throughout a 360° radius, thus enabling the ability to direct smoke to food placed on various sections of a grid. Rotatability may also be useful when food portions vary in size, allowing for the ability to more efficiently direct smoke to each food portion.

Smoker boxes of the invention have at least one port 4 and outlet 5, but may have as many ports and outlets as is desirable. The embodiment shown in FIG. 4 has two ports 4 and outlets 5 on one side of cover 3. In other embodiments of the invention, cover 3 may have a ports and outlet, on any or all sides. For example, in some embodiments, a square smoker box may have a port 4 and outlet 5 on 1, 2, 3, or 4 sides of cover 3, or multiple ports 4 and outlets 5 on any side.

A cylindrical smoker box may have port 4 and outlet 5 spaced anywhere on the cylindrical cover above base 1. In some preferred embodiments, port 4 and outlet 5 are present on the upper region, for example in the upper half of cover 3. This allows for smoke to exit through outlet 5 and be directed downward to food on a cooking grid on which the smoker box rests or upward to food on a cooking grid above the smoker box. In certain embodiments, port 4 and outlet 5 may be on the top of cover 3.

What is claimed is:

1. A smoker box for placement on a cooking grid of a barbecue grill, comprising:
    a. a base having an aperture;
    b. a cover, having a top and sides and capable of being positioned over the base, such that when positioned over the base the sides extend from the top to the cooking grid, thereby defining an enclosed cavity above the base, the cover having a port for the exit of smoke; and
    c. an outlet attached to the cover for directing smoke from the port onto food.

2. The smoker box of claim 1 wherein the base comprises a plurality of apertures.

3. The smoker box of claim 2 wherein the base comprises an open weave structure.

4. The smoker box of claim 1 wherein the base is attached to the cover.

5. The smoker box of claim 1 wherein the cover is assembled from a plurality of sections.

6. The smoker box of claim 1 further comprising a handle on the cover.

7. The smoker box of claim 1 wherein the outlet is rotatable.

8. The smoker box of claim 1 wherein the outlet is flexible.

9. The smoker box of claim 1 wherein the outlet is capable of directing smoke downward.

10. The smoker box of claim 1 wherein the outlet is capable of directing smoke upward.

11. The smoker box of claim 1 further comprising a side attached to the base.

12. The smoker box of claim 1 further comprising a door on the cover.

13. The smoker box of claim 1 wherein the cover comprises a removable top.

14. The smoker box of claim 1 wherein the base comprises sides thereby forming a basket.

15. A smoker box for placement on a cooking grid of a barbecue grill, comprising
    a. a base having a plurality of apertures;
    b. a cover having a plurality of ports for the exit of smoke, the cover configured to fit over the base and to rest on the cooking grid; and
    c. a plurality of outlets for directing smoke from the port onto food.

16. The smoker box of claim 15 wherein at least one outlet is straight.

17. The smoker box of claim 15 wherein at least one outlet is rotatable.

18. The smoker box of claim 15 further comprising a side attached to the base.

19. A smoker box for placement on a cooking grid of a barbecue grill, comprising:
    a. a base having an aperture;
    b. a cover capable of being positioned over the base, thereby defining an enclosed cavity above the base, wherein the cover comprises a plurality of ports for the exit of smoke; and
    c. a plurality of outlets attached to the cover for directing smoke from the ports onto food.

* * * * *